US006947979B1

(12) United States Patent
Pon

(10) Patent No.: US 6,947,979 B1
(45) Date of Patent: Sep. 20, 2005

(54) CONTROLLING USE OF A NETWORK RESOURCE

(75) Inventor: Michael Pon, Cupertino, CA (US)

(73) Assignee: Entrust, Inc., Plano, TX (US)

( * ) Notice: Subject to any disclaimer, the term of this patent is extended or adjusted under 35 U.S.C. 154(b) by 736 days.

(21) Appl. No.: 09/640,960

(22) Filed: Aug. 16, 2000

(51) Int. Cl.⁷ .......................................... G06F 15/173

(52) U.S. Cl. ...................... 709/223; 715/715; 715/733; 715/738

(58) Field of Search .............................. 707/101, 104, 707/103; 709/203, 223, 217; 713/200; 715/513, 715/511, 515, 523, 854; 719/311

(56) References Cited

U.S. PATENT DOCUMENTS

| | | | | |
|---|---|---|---|---|
| 5,774,123 A | * | 6/1998 | Matson ........................ | 715/854 |
| 5,793,966 A | * | 8/1998 | Amstein et al. ............ | 709/203 |
| 5,835,712 A | * | 11/1998 | DuFresne ................... | 709/203 |
| 6,044,466 A | * | 3/2000 | Anand et al. ............... | 713/200 |
| 6,078,924 A | * | 6/2000 | Ainsbury et al. ........... | 707/101 |
| 6,151,624 A | * | 11/2000 | Teare et al. ................. | 709/217 |
| 6,230,173 B1 | * | 5/2001 | Ferrel et al. ................ | 715/513 |
| 6,253,210 B1 | * | 6/2001 | Smith et al. ............. | 707/104.1 |
| 6,263,341 B1 | * | 7/2001 | Smiley .................... | 707/103 R |
| 6,286,043 B1 | * | 9/2001 | Cuomo et al. .............. | 709/223 |
| 6,327,628 B1 | * | 12/2001 | Anuff et al. ................ | 719/311 |
| 6,424,979 B1 | * | 7/2002 | Livingston et al. ......... | 715/511 |
| 6,725,425 B1 | * | 4/2004 | Rajan et al. ................ | 715/513 |
| 6,748,569 B1 | * | 6/2004 | Brooke et al. .............. | 715/523 |

* cited by examiner

Primary Examiner—Viet D. Vu
Assistant Examiner—Dustin Nguyen
(74) Attorney, Agent, or Firm—Hickman Palermo Truong & Becker LLP

(57) ABSTRACT

A method and apparatus for controlling use of a network resource. A network administrator accesses and navigates one or more network resources. A navigation capture server captures each request that is generated by the administrator's browser and each response that is received, and stores information about the requests and responses. The navigation capture server analyzes the captured information and generates an access/navigation script that represents the navigation actions taken by the administrator in the session. The script is edited and generalized in a manner such that upon playback of the script, the user may input actual useful information and the system may capture specific response data. When the client accesses and navigates the Web applications, context-specific information, relating to the client's then-current request, is passed from the User View Server to the navigation capture server. The navigation capture server merges the context-specific information into a corresponding request of the access/navigation script, and communicates a modified, context-specific request to the network resource. When the network resource generates a response, the message and any associated data are returned to the client through the navigation capture server and User View Server in a reciprocal manner. Thus, each user experiences a Web site with a uniform user interface or in a controlled way.

16 Claims, 8 Drawing Sheets

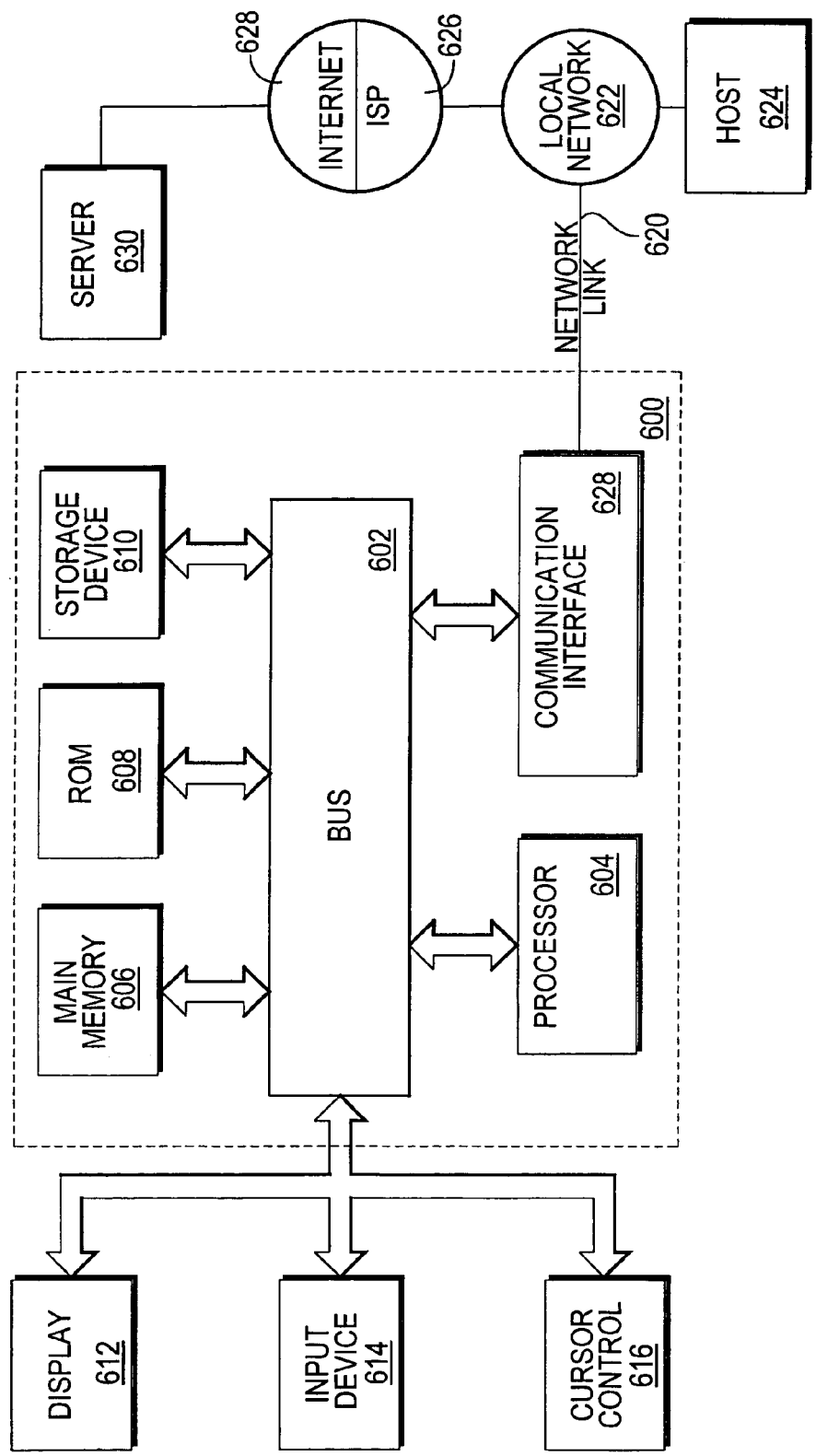

CONTROLLING USE OF A NETWORK RESOURCE

FIELD OF THE INVENTION

The present invention relates to computer systems and software. The invention relates more specifically to computer systems and software for controlling use of a network resource, for example, controlling navigation of a client through a networked computer system.

BACKGROUND OF THE INVENTION

Networked computer systems are in wide use. As use of networked computer systems has expanded, a need has developed to control or regulate access to the networks and servers, end stations, or other resources that are coupled to the networks. This problem is particularly acute in the context of institutional use of the global, packet-switched network known as the Internet. While a vast amount of information and executable applications are available online by accessing Internet servers using standard clients and browsers, institutions such as corporations, educational institutions, and government agencies now are seeking greater control over the nature and scope of use of the Internet and its resources by their employees and other users.

Increasingly, institutions desire to permit their employees and other users to access and use only certain servers. Further, these institutions need to permit their employees and other users to use or navigate through the "allowed" servers only in specific ways. In particular, an enterprise may wish to enforce a particular identity or profile for a particular Web site or other network resource. These needs are not adequately addressed by known technology and approaches.

For example, a corporation may wish to require its purchasing agents to use only specific Web servers or other online resources to make purchases on behalf of the company. Also, the corporation may wish to require each user of a particular Web server to navigate the server using a particular series of hyperlinks, commands, or other actions. As a specific example, the institution may wish to require its purchasing agents to use a particular kind of security, a specific authentication method, only a particular corporate credit card account, etc. Thus, the institution may wish to require its employees to use an Internet resource only in a pre-defined, rationalized manner.

Conventional network access control mechanisms rely on control of user names and passwords to govern access, authentication and authorization of users and clients to servers and other resources. However, management of user names and passwords becomes complicated as the number of servers and passwords grows larger.

In response, certain password management mechanisms have become available. For example, World Wide Web browser programs, such as Netscape Communicator and Microsoft Internet Explorer, can save passwords in a static table that is stored on the client computer. The table is indexed by the Uniform Resource Locator (URL) of each server, site, application or resource that the client accesses using the Internet. Each time the client or user accesses an Internet resource that requests a password, the browser checks its password table to determine whether it has a password associated with the URL of the resource. A disadvantage of this mechanism is that the passwords are stored only on one particular client machine. This is inconvenient, because a user must use the same computer to access a particular site using a saved password. If the user connects to the Web using a different computer, the password tables is unavailable and the user is required to re-enter his or her password.

Another similar mechanism is the World Wide Web service "mypassword.net." This service and others provide a digital keychain service. Using this service, an individual or client may create password information and store it in association with a URL that identifies an Internet resource with which the password information is used. A disadvantage of this mechanism is that each employee of an institution must separately register with the service and store the password information. Different employees will have different passwords, reducing employer control.

A drawback of both these mechanisms is that they are effective only in facilitating access to a particular resource, or pages or applications within the resource; they cannot be used to control a path of navigation within the resource. In the specific context of corporate purchasing, price comparison sites on the Internet provide a way to obtain useful purchase information. However, such sites are not specific to a particular institution, and do not address all purchasing criteria that are important or relevant to the enterprise. Further, such sites do not support a rationalized or scripted method of access.

Based on the foregoing, there is a clear need in this field for improved methods and mechanisms of controlling access to and use of network resources.

There is a particular need for a mechanism of enforcing a pre-defined, rationalized method of use of a network resource, such as an Internet Web site or application program.

There is also a need for a way to enforce a pre-defined navigation path through a network resource in order to maintain control over how the network resource is used and what kind of transactions are carried out using the resource.

Other needs will become apparent from the following description.

SUMMARY OF THE INVENTION

These needs, and other needs that will become apparent from the following description, are fulfilled by the present invention, which comprises, in one embodiment, a method of controlling use of a network resource. The network resource is accessed and navigated. Request and response messages that are generated during the navigating are detected. An access and navigation script is created and stored, based on the request and response messages. The access and navigation script is modified to result in creating and storing a generalized script that can accept context specific request and response information when used in an actual user navigation of the network resource.

In one embodiment, a method and apparatus for controlling use of a network resource is disclosed. A network administrator accesses and navigates one or more network resources. A navigation capture server captures each request that is generated by the administrator's browser and each response that is received, and stores information about the requests and responses. The navigation capture server analyzes the captured information and generates an access/navigation script that represents the navigation actions taken by the administrator in the session. The script is edited and generalized in a manner such that upon playback of the script, the user may input actual useful information and the system may capture specific response data.

When the client accesses and navigates the Web applications, context-specific information, relating to the client's then-current request, is passed from the User View Server to the navigation capture server. The navigation capture server merges the context-specific information into a corresponding request of the access/navigation script, and communicates a modified, context-specific request to the network resource. When the network resource generates a response, the message and any associated data are returned to the client through the navigation capture server and User View Server in a reciprocal manner. Thus, each user experiences a Web site with a uniform user interface or in a controlled way.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is a block diagram of a computer system with which aspects of the invention may be implemented.

DETAILED DESCRIPTION OF THE PREFERRED EMBODIMENT

A method and apparatus for controlling use of a network resource is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context: A Network System

Figure 1:
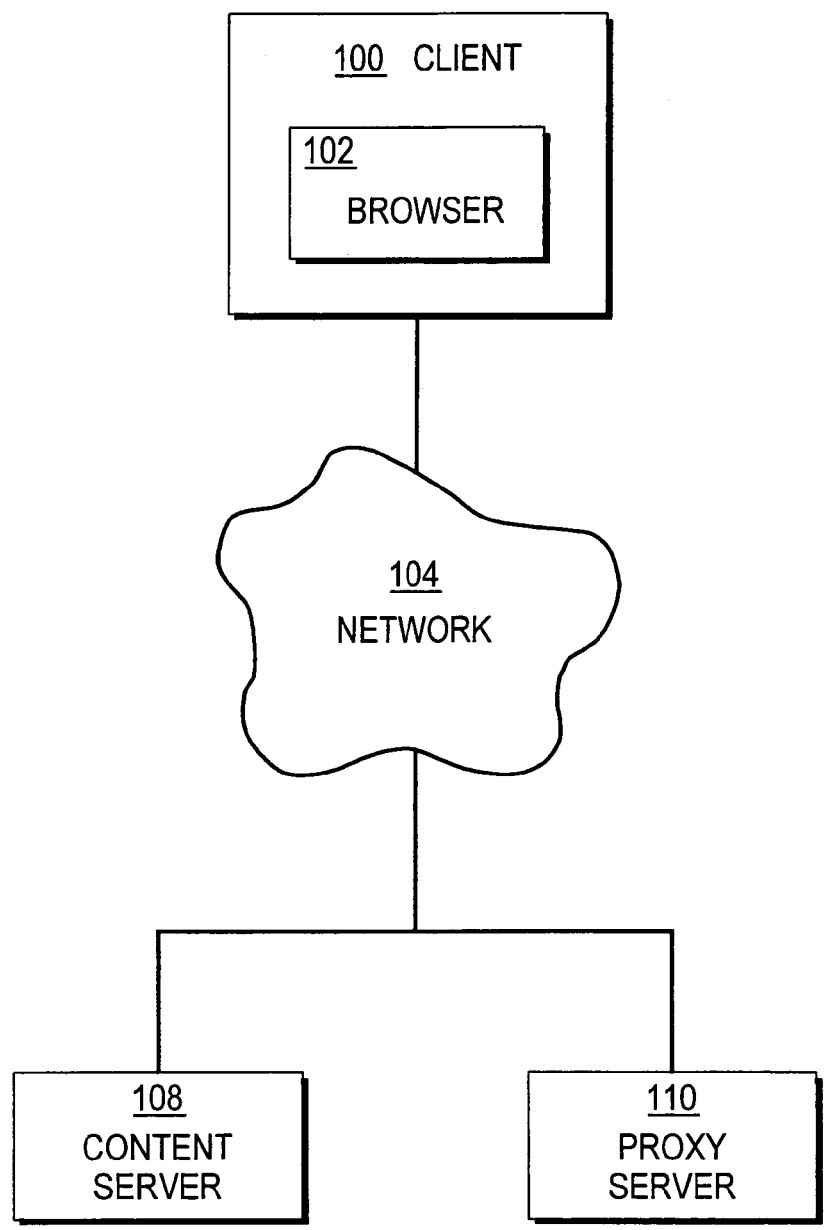
FIG. 1 is a block diagram of a network system of the prior art.

FIG. 1 is a block diagram of a network system of the prior art. Client 100 is coupled to network 104, which is logically coupled to content server 108 and optionally to proxy server 110. Client 100 is a network end station such as a workstation, personal computer, personal digital assistant, etc. Client 100 executes browser 102, which is a program that can connect to, request and receive information from ("browse") network resources.

Network 104 is one or more communication links between the elements that are coupled to network 104, and supporting hardware or software such as routers, switches, gateways, etc. Network 104 may comprise a local area network, wide area network, Intranet, or the global, packet-switched internetworks known as the Internet.

A content server 108 and, optionally, a proxy server 110 are coupled to network 104 logically separate from client 100. Content server 108 is an example of a network resource and comprises one or more computers that store and serve content, such as application programs, data, images, etc., to clients upon request. Proxy server 110 acts as an intermediary or buffer between content server 108 and requests from clients. For example, proxy server 110 may be configured to intercept content requests directed to content server 108 and interact with the requesting client in some way on behalf of the content server. Alternatively, proxy server 110 may modify the request or respond to the request itself if it has the information of content server 108 that the client is requesting.

In this configuration, client 100 can connect to content server 108 and obtain one or more resources. However, a disadvantage of this arrangement is that an enterprise of which client 100 is a part has no control over the way that the client uses the content server.

System for Controlling use of a Network Resource

Figure 2:
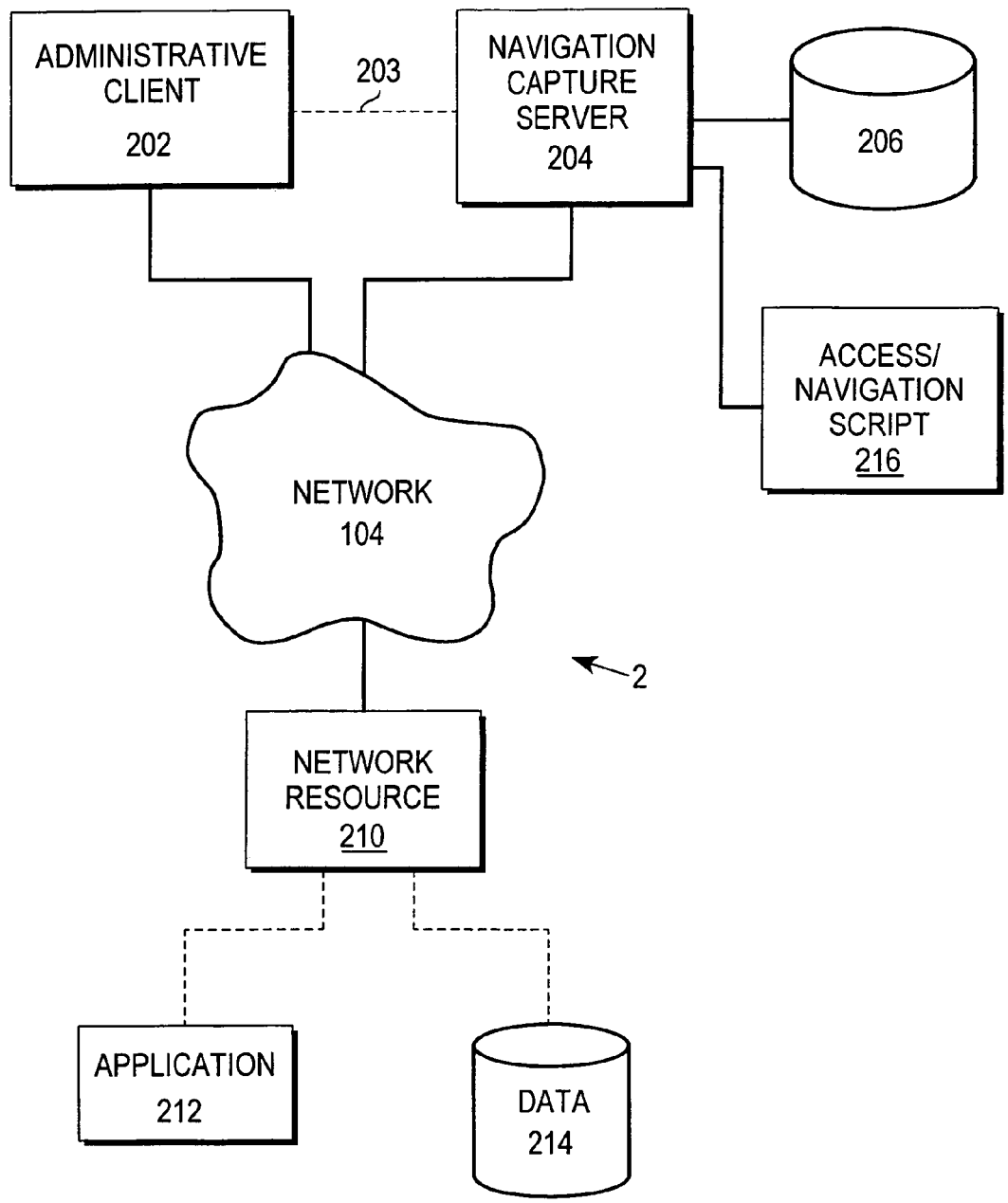
FIG. 2 is a block diagram of a system for creating and storing a navigation path for a network resource.

FIG. 2 is a block diagram of one embodiment of a system 2 for controlling use of a network resource.

An administrative client 202, a navigation capture server 204, and network resource 210 are logically coupled to network 104. Administrative client 202 is a network end station such as a workstation, personal computer, personal digital assistant, etc., that is associated with an administrative user of system 2. For example, the administrative user is a network supervisor, network administrator, information services manager, or some other individual with responsibility for controlling use of network resource 210. Administrative client 202 executes a browser and can connect to, request and receive information from navigation capture server 204 and network resource 210.

Navigation capture server 204 is one or more computer hardware or software elements that are configured to create and store ("capture") information that identifies request messages and response messages communicated between administrative client 202 and network resource 210 during a navigation session. For example, navigation capture server 204 may include a capture process for recording information about Administrator interaction with network resource 210, and a separate playback processor for playing back a script developed from that interaction. Use of navigation capture server 204 in these modes is described further below.

A database 206 is coupled to navigation capture server 204 for storing the information that identifies request messages and response messages communicated between administrative client 202 and network resource 210 during a navigation session.

Link 203 indicates that administrative client 202 can communicate with navigation capture server 204 and obtain information from database 206 effectively directly, although such communications may actually travel through network 104 or over a local area network that does not include network 104.

Network resource 210 is one or more computer hardware or software elements that contain programs or data useful to a client. For example, network resource 210 may be associated with one or more application programs 212 and one or more sets of data 214. Programs 212 may provide services such as electronic commerce applications or any other useful functionality. Data 214 may comprise images, business data, etc. In one embodiment, network resource 210 is a World Wide Web site. The specific configuration of network resource 210 is not critical. What is important is that network resource 210 contains programs or data that are accessible by and useful to a client through network 104.

Figure 3:
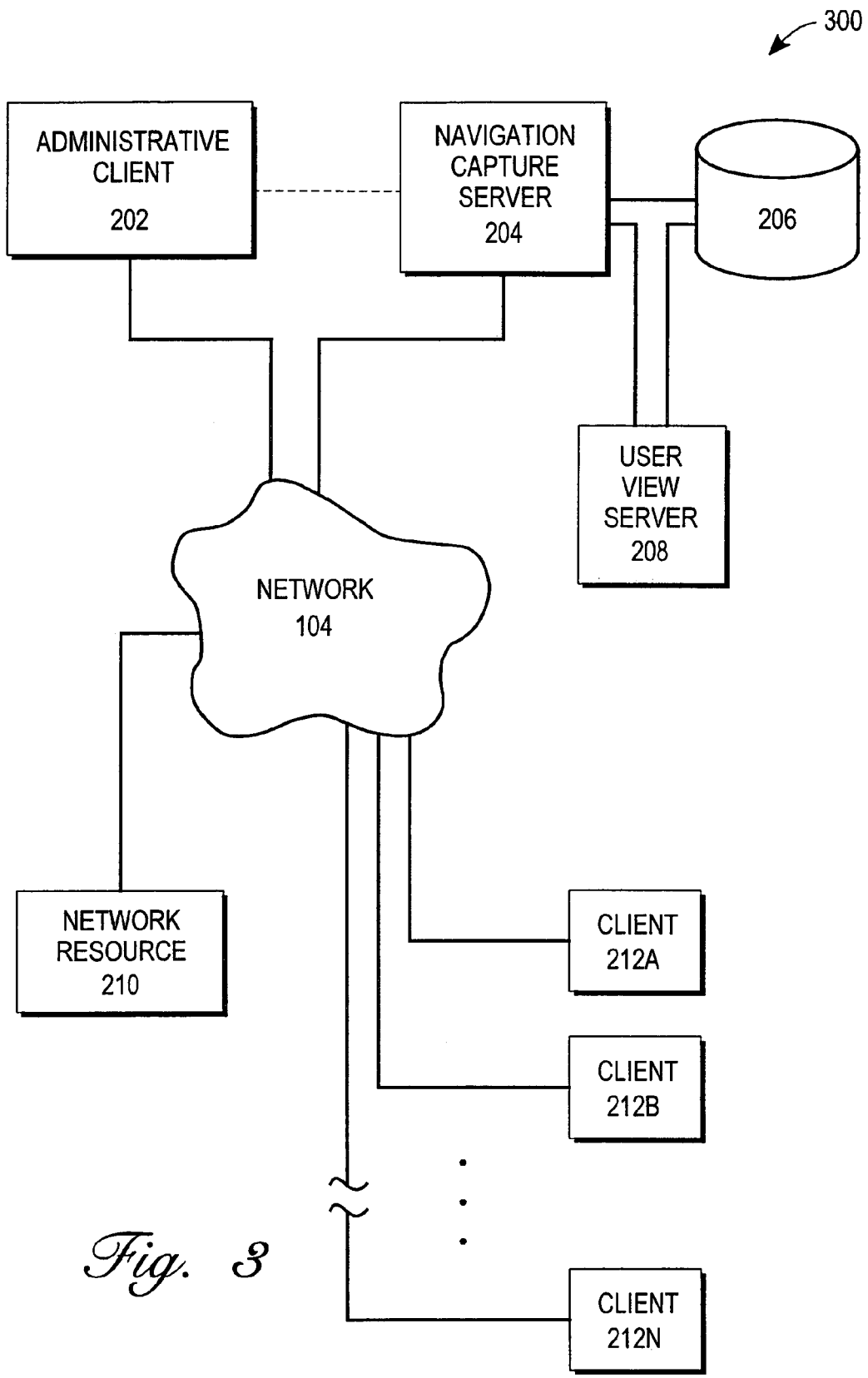
FIG. 3 is a block diagram of a system for controlling access and use of a client of a network resource.

FIG. 3 is a block diagram of a system 300 for controlling access and use of a client of a network resource.

Generally, FIG. 3 includes the elements of FIG. 2. Additionally, a user view server 208 is logically coupled to navigation capture server 204 and to database 206. User view server 208 communicates with navigation capture server 204 using Common Gateway Interface (CGI) scripts or commands. One or more clients 202A, 202B, 202N, etc. are coupled to network 104.

In this configuration, a Rationalized Access and Navigation Proxy ("Navigation Proxy") system is provided. Using the navigation capture server 204, an institutional network Administrator accesses and navigates one or more Web sites or other network resources 210. In one embodiment, network 104 is a network that supports the Hypertext Transfer Protocol (HTTP). As the Administrator accesses network resource 210, navigation capture server 204 captures each HTTP Request that is generated by the Administrator's browser and each HTTP Response that is received, and stores information about the Requests and Responses in database 206.

The navigation capture server 204 may record HTTP requests, including static URLs and requests containing query strings. The information may include complete HTML pages or any other information that is communicated between a client and server.

The navigation capture server 204 then analyzes the captured information and generates an access/navigation script 216. The access/navigation script represents navigation actions taken by the Administrator in a session with network resource 210. The access/navigation script 216 may be stored in database 206. The access/navigation script 216 generally comprises one or more HTTP requests. Each HTTP request may include, either statically or by a reference to a stored file or database record, complete HTML pages that have been parsed and modified to include references variables that can take on different values at runtime depending on the user context, tags that identify locations to insert context-dependent values, tags that identify locations to substitute values obtained from user input, etc. The script may also include conditional logic that links the HTTP requests.

The Administrator accesses the navigation capture server 204 using the Administrator's browser and uses it to edit and generalize the access/navigation script 216. The access/navigation script 216 is generalized in a manner such that upon playback of the script by a client or other end user, in the exemplary manner described below, the user may input actual useful information and the system may capture specific response data.

The Administrator may also use the navigation capture server 204 to create one or more internal Web applications that are bound to the access/navigation script 216. For example, the Administrator creates a home page of the system that the Administrator administrates, and creates a link in the home page to the access/navigation script. Further, the Administrator configures the User View Server 208 to enable a client or user to access the internal Web applications. This may involve associating a particular script 216 with the User View Server 208 and a particular network resource 210.

In order to access network resource 210, a user or its client requests a connection to the network resource. The request may be carried out by selecting a hyperlink of a Web page that is presented to the client by an access control server or other starting point. Each hyperlink is associated with a CGI script of the User View Server 208, and each CGI script contains one or more calls to a particular access/navigation script 216 that is managed by navigation capture server 204.

The User View Server 208, acting as proxy, permits access only to network resources that the Administrator has designated as "allowed," and permits access to those resources, such as network resource 210, only under the control of access/navigation script 216. For example, when the user requests a connection to a network resource 210, that has an associated access/navigation script 216, User View Server requests navigation capture server 204 to retrieve and launch the script. As a result, the user is logged in to the network resource 210 only in the manner previously specified in the script by the Administrator. All user connections reach only the User View Server as proxy for the network resource 210.

Further, when the client accesses and navigates the internal Web applications, contemporaneous and context-specific information, relating to the client's then-current or specific request, is passed from the User View Server 208 to the navigation capture server 204. User View Server 208 may communicate with navigation capture server 204, for example, using a servlet or a CGI call that presents data from the client to the navigation capture server 204, requests the navigation capture server 204 to play back a designated script using the client information as input. Navigation capture server 204 retrieves the script from a database or memory, launches the script, substitutes the input information into the script at predefined locations, and creates a contemporaneous or context-specific HTTP response based on the script or substitutions. In one embodiment, navigation capture server 204 merges the context-specific information into a corresponding request of the access/navigation script 216, and communicates a modified, context-specific request to the network resource 210 over network 104. Navigation capture server 204 then communicates the modified, context-specific request to network resource 210 for action.

For example, assume that the network resource 210 is an e-commerce site and includes an order entry page that is filled out and submitted by a client to order one or more products. The user fills in fields of the form and submits the form. The access/navigation script 216 intercepts requests in the session. The script contains predefined information for filling in fields of the order entry page, as specified by the Administrator. The script fills in fields of the form with the predefined information, which may cause entries of the user to be overwritten with predefined information, and sends the completed form to the network resource 210. In this way, the script enforces navigation policies of the Administrator.

At script playback time during a user session, the navigation capture server 204 appears to network resource 210 as a browser. Accordingly, navigation capture server 204 implements all necessary browser functions so that it can resolve URLs into IP addresses, identify links and follow them as needed, etc., as if it were a browser. This functionality ensures that script playback results in navigation of network resource 210 in a manner equivalent to browser navigation, but in a manner controlled by the script and that includes requests with context-specific information.

When network resource 210 generates a response, the response message and any associated data are returned to the client through the navigation capture server 204 and User View Server 208. Alternatively, the response message or its associated data are captured by the navigation capture server as specified by the access/navigation script 216.

Thus, a practical system involves creating one or more application programs that are associated with the generalized script, and delivering services or information from the network resource through a user view server that is configured to execute the application programs under control of the generalized script and as a proxy for the network resource. User View Server 208 provides a client or other user with a rationalized view of network resource 210 that is controlled and organized according to the generalized script. Further, the user or client can navigate the network resource only as set forth in the generalized script. As a result, the user's access to and use of the network resource 210 are controlled in a pre-determined way, based upon the administrator's prior navigation of the network resource in an authorized or desired manner.

A system having the foregoing configuration may be used with several applications or in several useful contexts. For example, an internal Web application can be set up to provide a single sign-on function for a second Web application for a group of users. The access/navigation script 216 would retain and play back the access information for the second Web application. The first internal Web Application would link the user through to the second Web application using the access/navigation script 216.

Different scripts appropriate for users having different roles, or for users who are organized in different departments, may be configured.

As another example, several Web applications can share a single Rationalized Internal Web Application. The inputs from a single Internal Web Application can be merged into the request and response playback of several different access/navigation scripts 216. The specific response data from the different Web applications can be formatted to fit the form of the single Internal Web Application by the corresponding access/navigation scripts 216.

Navigation capture server 204 and User View Server 208 may be co-located, and may be implemented as separate processes executed by the same server or computer, or as one integrated process executed by one or more servers or computers. Further, navigation capture server 204 and User View Server 208 may share instructions and data or may be associated with a storage unit that has program instructions and data for both elements.

In an alternative embodiment, user access to User View Server 208 is controlled by an access control server of the type described in co-pending U.S. patent application Ser. No. 09/248,764, filed Feb. 12, 1999, entitled Role-Based Navigation of Information Resources. In another alternative, user access to User View Server 208 is controlled by an access control server such as getAccess™, commercially available from enCommerce, Inc., of Santa Clara, Calif.

Method of Creating and Storing a Navigation Path

Figure 4A:
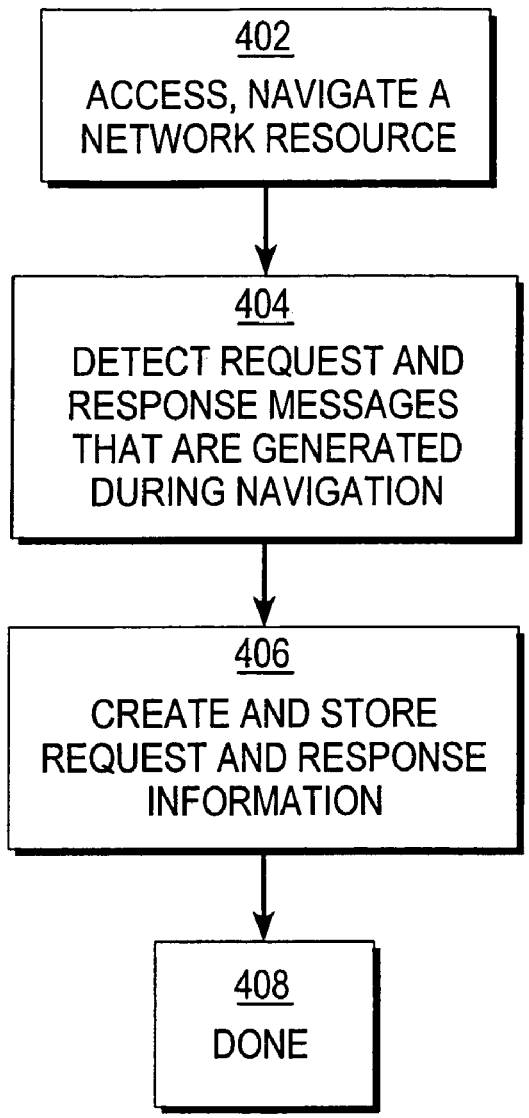
FIG. 4A is a flow diagram of a method of creating and storing a navigation path for a network resource.

FIG. 4A is a flow diagram of a method of creating and storing a navigation path for a network resource.

In block 402, a network resource is accessed and navigated. For example, a client computer, associated with an administrator or some other user, uses a browser to connect to a particular network resource, such as a Web site. In block 404, request messages and response messages that are generated during navigation are detected. For example, a software element associated with the browser or with a separate server may detect each request and response communicated from or to the browser.

In block 406, request and response information is created and stored. For example, meta-information that identifies or represents the requests and responses is stored in a database that is associated with the client, browser, or separate server.

In this manner, requests by the browser and responses of the network resource to the browser are captured and stored for later use and analysis. Processing concludes at block 408, which may involve terminating a process or passing control to another process for further process steps.

Figure 4B:
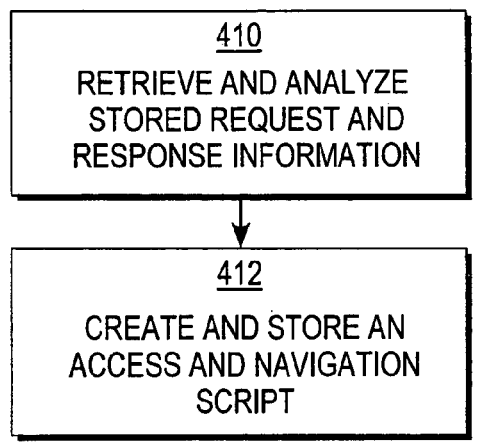
FIG. 4B is a flow diagram of further steps in a method of creating and storing a navigation path for a network resource.

FIG. 4B is a flow diagram of further steps in a method of creating and storing a navigation path for a network resource.

In block 410, the request and response meta-information that was stored in block 406 is retrieved and analyzed, and in block 412 an access and navigation script is created and stored based on the request and response meta-information. For example, in one embodiment, navigation capture server 204 analyzes the captured meta-information and generates an access/navigation script 216. The access/navigation script represents navigation actions taken by the Administrator in a session with the network resource. The access/navigation script 216 may be stored in database 206.

Figure 4C:
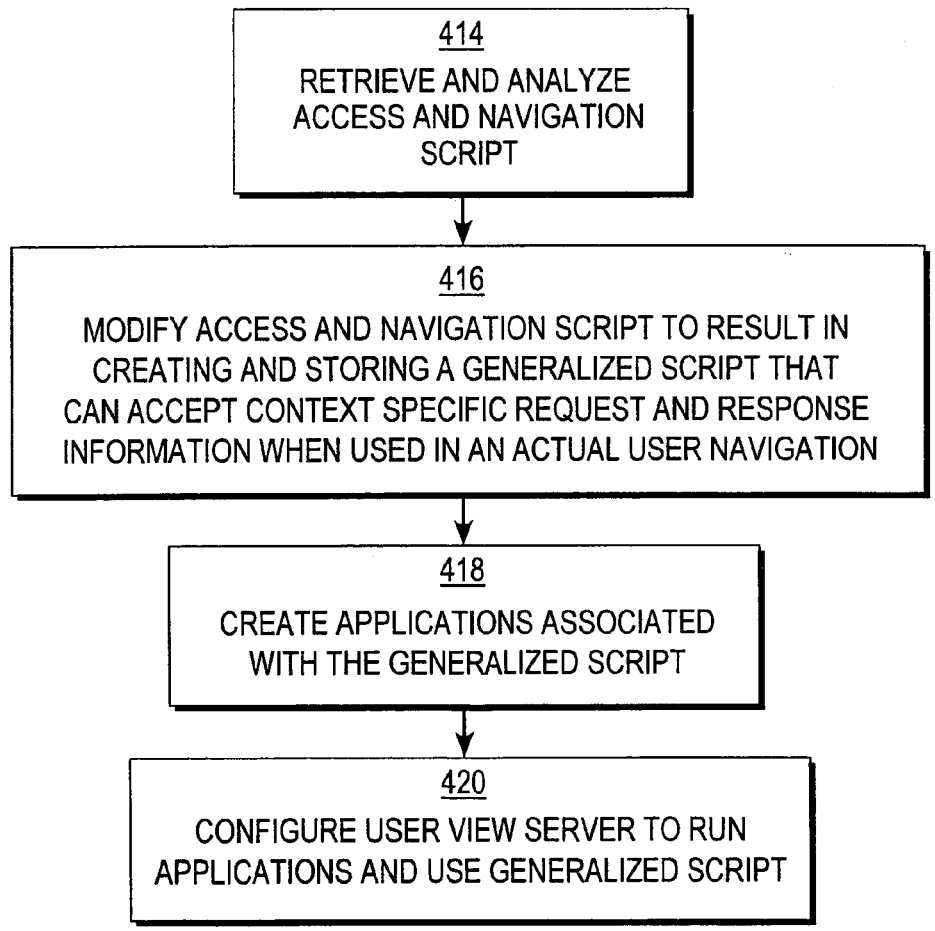
FIG. 4C is a flow diagram of further steps in a method of creating and storing a navigation path for a network resource.

FIG. 4C is a flow diagram of further steps in a method of creating and storing a navigation path for a network resource.

In block 414, the access and navigation script that was created and stored in block 412 is retrieved and analyzed. In block 416, the access and navigation script is modified to result in creating and storing a generalized script that can accept context specific request and response information when it is used in an actual user navigation of a network resource. For example, in one embodiment, an Administrator accesses the navigation capture server 204 using the Administrator's browser and uses it to edit and generalize the access/navigation script 216.

In block 418, one or more applications that are associated with the generalized script are created. For example, a user may use the navigation capture server 204 to create one or more internal Web applications that are bound to the access/navigation script 216. In block 420, a user view server is configured to run the applications that are created in block 418, and to use the generalized access and navigation script. For example, in one embodiment, an Administrator configures User View Server 208 to enable a client to access internal Web applications.

Method of Controlling Access and use of a Client

Figure 5A:
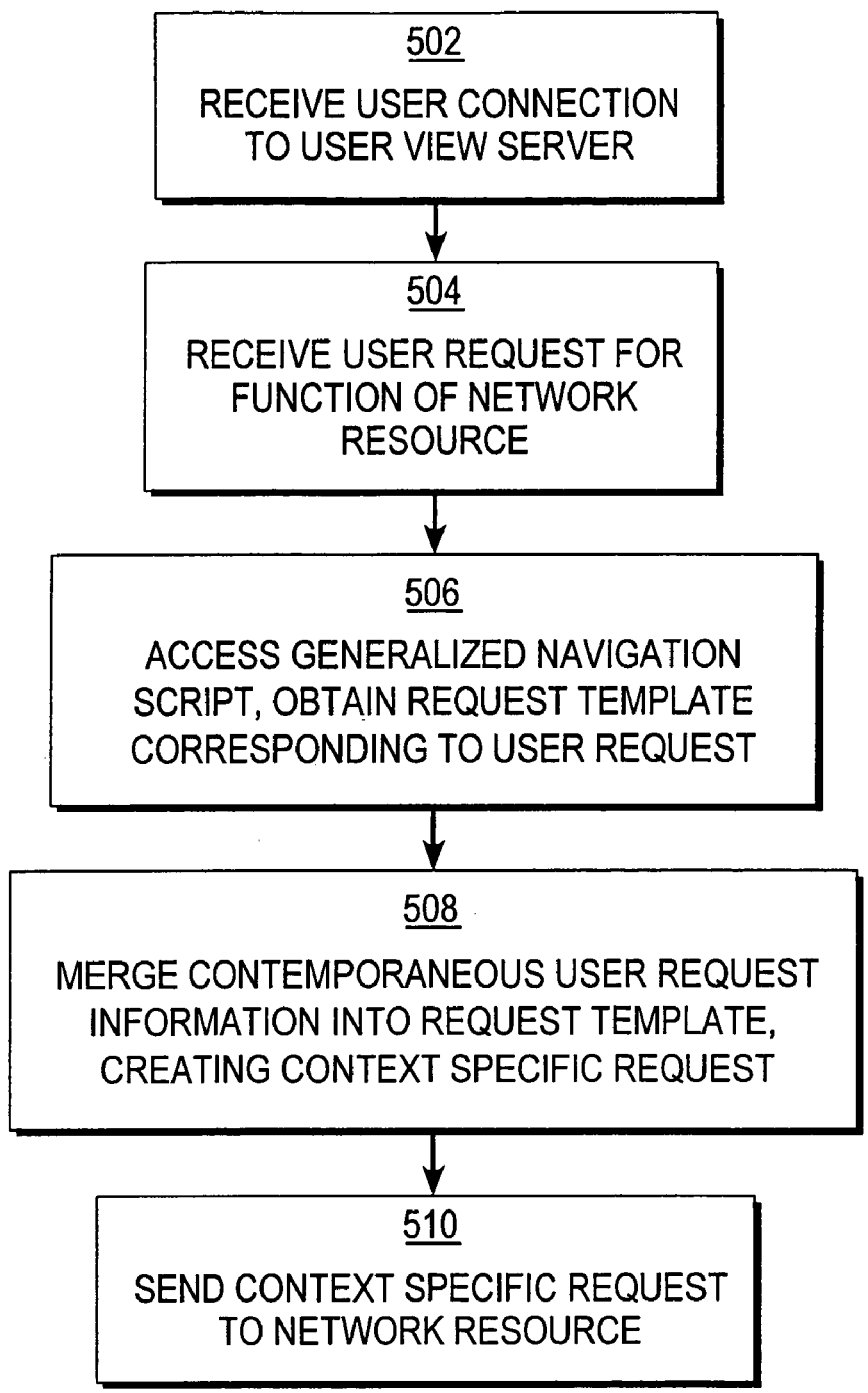
FIG. 5A is a flow diagram of a method of controlling access and use of a client of a network resource.

FIG. 5A is a flow diagram of a method of controlling access and use of a client of a network resource.

In block 502, a user connection to a user view server is received. For example, a client such as client 212A, 212B, 212N requests a connection to network resource 210. User View Server 208, acting as proxy for network resource 210, intercepts and accepts the client connection. In block 504, a user request for a function of a network resource is received. For example, one of the clients 212A, 212B, 212N requests a Web page that is the opening page of a particular Web application offered by network resource 210, e.g., a catalog page of an electronic commerce Web site.

In block 506, the generalized navigation script is accessed, and a request template corresponding to the user's request is obtained. For example, when the client accesses and navigates the internal Web applications, contemporaneous and context-specific information, relating to the client's then-current or specific request, is passed from the User View Server 208 to the navigation capture server 204. In block 508, contemporaneous user request information is merged into the request template, thereby creating a context-specific request. For example, the navigation capture server 204 merges the context-specific information into a corresponding request of the access/navigation script 216. In block 510, a context-specific request is sent to the network resource. For example, navigation capture server 204 communicates a modified, context-specific request to the network resource 210.

Figure 5B:
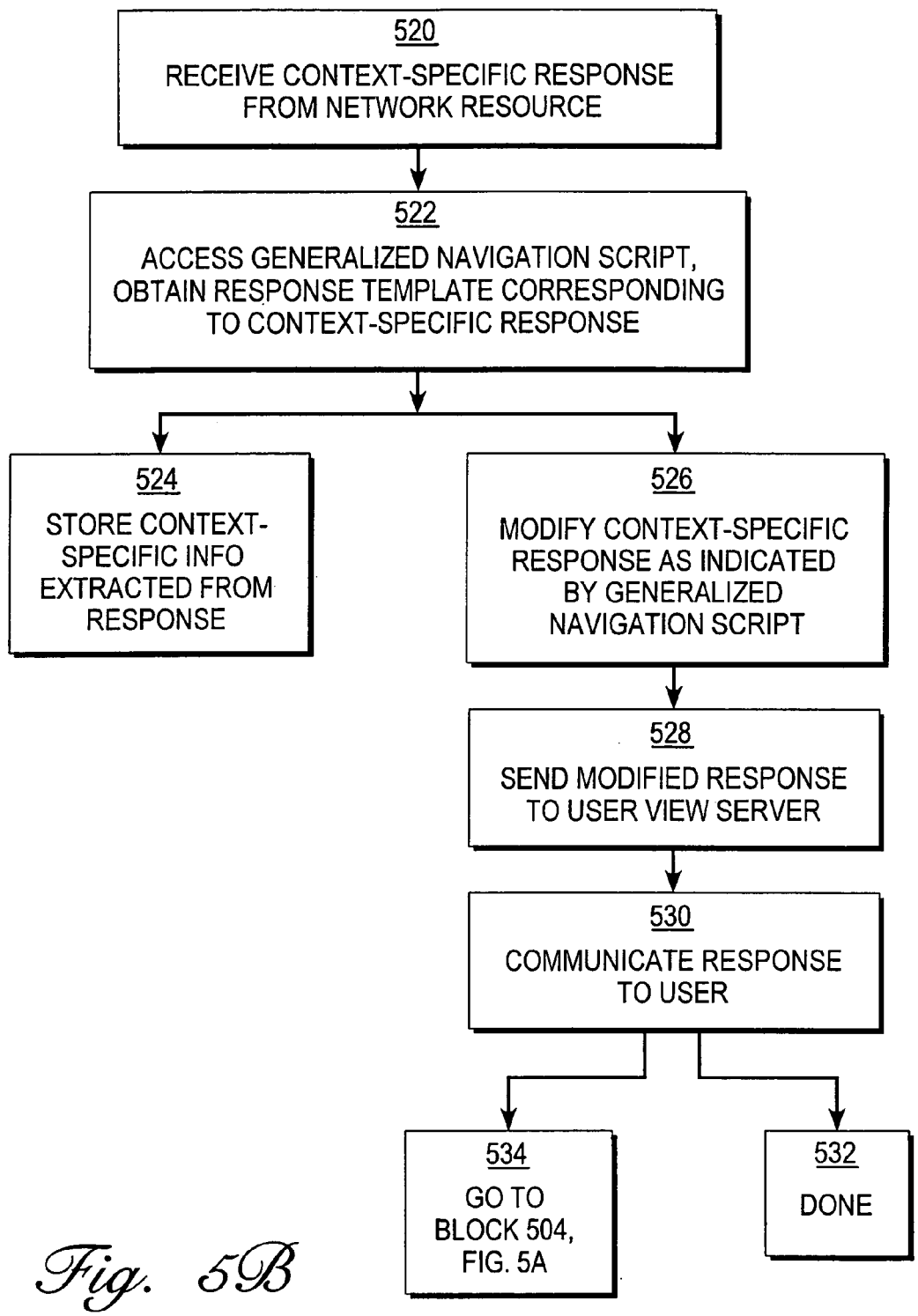
FIG. 5B is a flow diagram of further steps in a method of controlling access and use of a client of a network resource.

FIG. 5B is a flow diagram of further steps in a method of controlling access and use of a client of a network resource.

In block 520, context-specific response information is received from a network resource. In block 522, the generalized access/navigation script is accessed, and a response template corresponding to the context-specific response is obtained.

In block 524, context-specific information extracted from the response message is stored, for example, in database 206. This step enables the system to capture response information that is provided by network resource 210 for other use.

Alternatively, as indicated by block 526, the context-specific response of the network resource 210 is modified as indicated by the generalized navigation script. In block 528, the modified response is sent to the user view server. In block 530, the response is communicated to the user. Thereafter, control may pass back to block 504 for processing another user request, or control may terminate as indicated by block 532, or control may be passed to another process or step.

Thus, in one embodiment, when network resource 210 generates a message in response to a client request, the response message and any associated data are returned to the client through the navigation capture server 204 and User View Server 208 as proxies. Alternatively, the response message or its associated data are captured by the navigation capture server as specified by the access/navigation script 216.

Using a system configured according to the description in this document, or a method as described in this document, a navigation capture server can record steps taken by an administrative user in navigating a network resource, edit the navigation information to make it more general, and post-link navigation scripts to a population of a plurality of users, through the User View Server. As a result, each user experiences a Web site in a controlled manner or with a uniform user interface based on the generalized script. Each user has a consistent view of the applications and information of the network resource and can navigate through the network resource only in the manner defined by the generalized script. At the same time, the user can request and receive specific information according to a particular, then-current need or project.

The processes of FIG. 4A, FIG. 4B, FIG. 4C, FIG. 5A, FIG. 5B may be carried at separate times with a significant time interval between each process, or in immediate succession, or in any other order or interval arrangement. Each process may be implemented in one or more computer programs, processes or routines executed by appropriate clients, servers, or other computer hardware.

Hardware Overview

FIG. 6 is a block diagram that illustrates a computer system 600 upon which an embodiment of the invention may be implemented.

Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for controlling use of a network resource. According to one embodiment of the invention, controlling use of a network resource is implemented by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application implements controlling use of a network resource.

The received code may be executed by processor 604 as it is received, and/or stored in storage device 610, or other non-volatile storage for later execution. In this manner, computer system 600 may obtain application code in the form of a carrier wave.

SCOPE OF DISCLOSURE

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of controlling use of a network resource, comprising the computer-implemented steps of:
    capturing one or more request and response communications between a client and a server during a session of navigating the network resource;
    storing in electronic memory meta-information that represents the one or more request and response communications;
    automatically creating and storing an access and navigation script based on the meta-information, wherein the access and navigation script represents navigation actions performed during the session of navigating and includes a request to a server;
    modifying the access and navigation script to result in creating and storing a generalized script that, upon playback, can accept context specific request information at a predefined location in the generalized script, for association with the request to the server;
    receiving a request from a client for use of a function or resource of the network resource;
    in response to the request, accessing the generalized script;
    merging contemporaneous information that is specific to the client request into the generalized script at the predefined location to result in creating a context-specific request that includes a context-specific version of the request to the server;
    communicating the context-specific request to the network resource.

2. A method as recited in claim 1, further comprising the steps of:
    receiving a context-specific response from the network resource;
    accessing the generalized script to obtain a response template corresponding to the context-specific response;
    modifying the context-specific response according to the generalized script;
    communicating the modified response to the client.

3. A method as recited in claim 1, further comprising the steps of:
    receiving a context-specific response from the network resource;
    accessing the generalized script to obtain a response template corresponding to the context-specific response;
    modifying the context-specific response according to the generalized script;
    communicating the modified response to a user view server for subsequent communication to the client, whereby the client receives a view of the network resource that is controlled according to the generalized script.

4. A method of controlling use of a Web site, comprising the computer-implemented steps of:
    capturing one or more request and response communications between a client and a server hosting the Web site during a session of navigating the Web site;
    storing in electronic memory meta-information that represents the one or more request and response communications;
    automatically creating and storing an access and navigation script based on the meta-information, wherein the access and navigation script represents navigation actions performed during the session of navigating and includes a request to the server;
    modifying the access and navigation script to result in creating and storing a generalized script that, upon playback, can accept context specific request information at a predefined location in the generalized script, for association with the request to the server when used in an actual user navigation of the Web site;
    receiving a request from a client for use of a function or resource of the network resource;

in response to the request, accessing the generalized script;

merging contemporaneous information that is specific to the client request into the generalized script at the predefined location to result in creating a context-specific request that includes a context-specific version of the request to the server;

communicating the context-specific request to the network resource.

5. Apparatus for controlling use of a network resource, comprising:

a navigation capture server that can access a network resource and that is coupled to a data store;

a user view server coupled to the navigation capture server and to the data store;

instructions stored in association with the navigation capture server and user view server which, when executed by one or more processors of the navigation capture server or user view server, cause the one or more processors to carry out the steps of:

capturing one or more request and response communications between a client and a server during a session of navigating the network resource;

storing in electronic memory meta-information that represents the one or more request and response communications;

automatically creating and storing an access and navigation script based on the meta-information, wherein the access and navigation script represents navigation actions performed during the session of navigating and includes a request to a server;

modifying the access and navigation script to result in creating and storing a generalized script that, upon playback, can accept context specific request information at a predefined location in the generalized script, for association with the request to the server;

receiving a request from a client for use of a function or resource of the network resource;

in response to the request, accessing the generalized script;

merging contemporaneous information that is specific to the client request into the generalized script at the predefined location to result in creating a context-specific request that includes a context-specific version of the request to the server;

communicating the context-specific request to the network resource.

6. Apparatus as recited in claim 5, wherein the instructions further comprise instructions for carrying out the steps of:

receiving a context-specific response from the network resource;

accessing the generalized script to obtain a response template corresponding to the context-specific response;

modifying the context-specific response according to the generalized script;

communicating the modified response to the client.

7. Apparatus as recited in claim 5, wherein the instructions further comprise instructions for carrying out the steps of:

receiving a context-specific response from the network resource;

accessing the generalized script to obtain a response template corresponding to the context-specific response;

modifying the context-specific response according to the generalized script;

communicating the modified response to the user view server for subsequent communication to the client, whereby the client receives a view of the network resource that is controlled according to the generalized script.

8. A computer-readable medium carrying one or more sequences of instructions for controlling use of a network resource, wherein execution of the one or more sequences of instructions by one or more processors causes the one or more processors to perform the steps of:

capturing one or more request and response communications between a client and a server during a session of navigating the network resource;

storing in electronic memory meta-information that represents the one or more request and response communications;

automatically creating and storing an access and navigation script based on the meta-information, wherein the access and navigation script represents navigation actions performed during the session of navigating and includes a request to a server;

modifying the access and navigation script to result in creating and storing a generalized script that, upon playback, can accept context specific request information at a predefined location in the generalized script, for association with the request to the server when used in an actual user navigation of the network resource;

receiving a request from a client for use of a function or resource of the network resource;

in response to the request, accessing the generalized script;

merging contemporaneous information that is specific to the client request into the generalized script at the predefined location to result in creating a context-specific request that includes a context-specific version of the request to the server; communicating the context-specific request to the network resource.

9. A method as recited in claim 1, wherein access by the client to the network resource is controlled in a pre-determined way, based upon the session of navigating the network resource from which the navigation script was created.

10. A method as recited in claim 1, wherein access by the client to the network resource is limited to one or more navigation paths navigated during the session of navigating the network resource from which the navigation script was created.

11. An apparatus as recited in claim 5, wherein access by the client to the network resource is controlled in a pre-determined way, based upon the session of navigating of the network resource from which the navigation script was created.

12. An apparatus as recited in claim 5, wherein access by the client to the network resource is limited to one or more navigation paths navigated during the session of navigating the network resource from which the navigation script was created.

13. The method of claim 1, wherein the step of merging contemporaneous information includes overwriting a portion of the contemporaneous information with predefined information.

14. The method of claim 4, wherein the step of merging contemporaneous information includes overwriting a portion of the contemporaneous information with predefined information.

15. The apparatus of claim 5, wherein the step of merging contemporaneous information includes overwriting a portion of the contemporaneous information with predefined information.

16. The computer-readable medium of claim 8, wherein execution of the one or more sequences of instructions causes the one or more processors to perform the step of merging contemporaneous information by overwriting a portion of the contemporaneous information with predefined information.

* * * * *

UNITED STATES PATENT AND TRADEMARK OFFICE
CERTIFICATE OF CORRECTION

PATENT NO. : 6,947,979 B1
DATED : September 20, 2005
INVENTOR(S) : Michael Pon

It is certified that error appears in the above-identified patent and that said Letters Patent is hereby corrected as shown below:

Column 14,
Line 52, delete "navigating of the" and insert -- navigating the --.

Signed and Sealed this

Thirteenth Day of December, 2005

JON W. DUDAS
*Director of the United States Patent and Trademark Office*